US009778724B2

(12) United States Patent
Jun et al.

(10) Patent No.: US 9,778,724 B2
(45) Date of Patent: Oct. 3, 2017

(54) POWER-SAVING COMPUTER SYSTEM WITH A WATCHDOG COMPUTER AND METHOD FOR CONTROLLING POWER SAVING OF COMPUTER SYSTEM WITH A WATCHDOG COMPUTER

(71) Applicant: ELECTRONICS AND TELECOMMUNICATIONS RESEARCH INSTITUTE, Daejeon (KR)

(72) Inventors: Sunglk Jun, Daejeon (KR); Baik Song An, Daejeon (KR); Byeong Thaek Oh, Daejeon (KR); Byung-gyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 364 days.

(21) Appl. No.: 14/315,561

(22) Filed: Jun. 26, 2014

(65) Prior Publication Data
US 2015/0185804 A1 Jul. 2, 2015

(30) Foreign Application Priority Data

Dec. 26, 2013 (KR) .......................... 10-2013-0164504

(51) Int. Cl.
G06F 1/32 (2006.01)
(52) U.S. Cl.
CPC .......... G06F 1/3209 (2013.01); G06F 1/3206 (2013.01); G06F 1/3265 (2013.01);
(Continued)

(58) Field of Classification Search
None
See application file for complete search history.

(56) References Cited

U.S. PATENT DOCUMENTS 7,711,868 B2 * 5/2010 Rhoten ................. G06F 1/3203
710/15
8,001,404 B2 * 8/2011 Pathak .................. G06F 1/3203
370/254

(Continued)

FOREIGN PATENT DOCUMENTS

CN          102413554       *  4/2012
KR       2002-0012745          2/2002

(Continued)

Primary Examiner — Kim Huynh
Assistant Examiner — Danny Chan
(74) Attorney, Agent, or Firm — Staas & Halsey LLP

(57) ABSTRACT

A first computer system including a first computer and a first display device is provided. The first computer includes a processor. The first display device is connected to the first computer and displays a graphics signal. The processor receives at least one of system state information and power state information from a second computer system including a second computer and a second display device, and generates a first power saving control command on the basis of the received state information. The processor transmits the first power saving control command to the second computer system. The first power saving control command is a command for controlling power saving of at least one of the second computer and the second display device.

17 Claims, 7 Drawing Sheets

(52) U.S. Cl.
CPC .......... *G06F 1/3293* (2013.01); *Y02B 60/121* (2013.01); *Y02B 60/1242* (2013.01)

(56) References Cited

U.S. PATENT DOCUMENTS

| | | | | |
|---|---|---|---|---|
| 8,375,220 | B2* | 2/2013 | Prakash | G06F 21/305 713/187 |
| 8,769,315 | B1* | 7/2014 | Ortiz | G06F 1/3206 713/300 |
| 9,026,814 | B2* | 5/2015 | Aasheim | G06F 1/3206 713/310 |
| 2004/0268159 | A1 | 12/2004 | Aasheim et al. | 713/300 |
| 2006/0129855 | A1* | 6/2006 | Rhoten | G06F 1/3203 713/320 |
| 2011/0016283 | A1* | 1/2011 | Davis | G06F 3/0605 711/170 |
| 2011/0138199 | A1* | 6/2011 | Shih | G06F 1/266 713/310 |
| 2012/0050260 | A1* | 3/2012 | Cheng | G06F 3/1438 345/419 |
| 2013/0232254 | A1* | 9/2013 | Srikanth | H04L 43/0876 709/224 |
| 2014/0013137 | A1* | 1/2014 | Wilson | G06F 1/00 713/323 |
| 2014/0122905 | A1* | 5/2014 | Chen | G06F 1/26 713/300 |
| 2016/0011648 | A1* | 1/2016 | Zhang | H04L 43/0817 713/323 |

FOREIGN PATENT DOCUMENTS

| | | |
|---|---|---|
| KR | 10-2005-0002667 | 1/2005 |
| KR | 10-2012-0088435 | 8/2012 |
| KR | 10-2013-0033852 | 4/2013 |
| KR | 10-2013-0076144 | 7/2013 |

* cited by examiner

POWER-SAVING COMPUTER SYSTEM WITH A WATCHDOG COMPUTER AND METHOD FOR CONTROLLING POWER SAVING OF COMPUTER SYSTEM WITH A WATCHDOG COMPUTER

CROSS-REFERENCE TO RELATED APPLICATION

This application claims priority to and the benefit of Korean Patent Application No. 10-2013-0164504 filed in the Korean Intellectual Property Office on Dec. 26, 2013, the entire contents of which are incorporated herein by reference.

BACKGROUND OF THE INVENTION (a) Field of the Invention

The present invention relates to a power-saving computer system capable of saving (or reducing) power, and a method for controlling power saving of a computer system.

(b) Description of the Related Art

As information technology (IT) systems increasingly have high performance and large capacity, energy consumption thereof is increased, and thus a technique for reducing power consumption in the IT field is required. In general, major factors of power consumption of computer systems include a maximum rate central processing unit (CPU) of a computer main frame, a large monitor screen, non-smoothness of controlling an idle state of a CPU, and the like. In spite of the major factors of power consumption, if a CPU rate is lowered or a monitor is switched to a miniature LCD or LED monitor, power consumption may be significantly reduced. However, such a power saving method has a problem in that a computer main frame cannot recognize characteristics of work or surrounding situations and adapt itself thereto, and in this state, if the computer main frame performs power saving monitoring, sleep controlling is rather interfered and 10 to 20% of power is additionally consumed due to power saving monitoring.

Meanwhile, in case of a typical computer system, a display motor consumes approximately 1 to 60 W of power in an idle state and approximately 150 W of power in an active state. Here, it can be seen that the display device (e.g., monitor) consumes a considerably large amount of power per unit time, relative to the computer main frame. Existing power saving methods have focused on CPU-oriented power consumption within computer main frames.

For example, in case of a TV video service, receiving TV by a small digital TV (DTV) is greatly advantageous in terms of power consumption, rather than receiving TV through a large monitor. Computers with a variety of selections of power consumption have been released in line with the advancement of computer technologies. In detail, less power is consumed in the order of a high performance computer, a high performance server, a personal computer, a personal notebook computer, and a personal mobile phone, and differences in power consumption therebetween are significant.

Meanwhile, if a task which does not consume a great amount of power is performed through a high performance and high resolution computer, power may be wasted. Currently, a method by which, if a task requires a high performance computer, the high performance computer processes the corresponding task, and otherwise, a computer system is automatically adjusted to fit an optimal environment according to the corresponding task, is required.

Meanwhile, it is difficult for a computer system to achieve target power saving only with low power design of its own.

On the other hand, in order to save power of display devices that consume a great amount of power, among devices of computer systems, a screen saver function may be used; however, although a screen saver operates, power of display devices is still consumed. In addition, a method for adjusting brightness of a backlight of a display device is used to save power, but a power saving effect thereof is not great.

Also, power consumption may be considerably reduced by turning off a display device. However, if a display device is in a turned-off state, a current state of a computer main frame cannot be known. In the case in which a display device is in a turned-off state, since a user cannot know a state of a computer system, he or she may shut down the computer system by mistake or may wake up the computer system to the original state. In such a case, since unnecessary power is consumed for the computer system to be returned to its original state, power is wasted.

FIG. 1 is a view illustrating an existing computer system 1000.

An existing computer system 1000 includes a display device 1100, a computer main frame 1200, and a power supply device 1300. The computer main frame 1200 includes a processor 1210, a memory 1220, and a graphics adapter 1230.

The processor 1210 collects a power state of the computer system 1000, analyzes the collected power state, and determines a power saving policy according to power saving configuration information stored in the memory 1220. The processor 1210 performs power saving control on the computer main frame 1200 and the display device 1100 according to the determined power saving policy.

Meanwhile, in the case of the power saving method of the computer system 1000, since the processor 1210 of the computer system 1000 collects a power state, analyzes the power state, and determines a power saving policy, a large amount of power is consumed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and system for controlling power saving of a main computer system through a dedicated low power computer that analyzes a system state and a power state of the main computer system and determines a power saving policy.

An exemplary embodiment of the present invention provides a first computer system. The first computer system may include a first computer including a processor, and a first display device connected to the first computer and configured to display an image through a graphics signal. The processor may receive at least one of information among system state information and power state information from a second computer system including a second computer and a second display device, generate a first power saving control command on the basis of the received state information, and transmit the generated first power saving control command to the second computer system. The first power saving control command may be a command for controlling power saving of at least one of the second computer and the second display device.

When the received state information is the system state information, the processor may analyze a system state of the second computer system on the basis of the system state information, and generate the first power saving control command on the basis of a first result by the analysis. When the received state information is the power state information, the processor may analyze a power state of the second computer system on the basis of the power state information, and generate the first power saving control command on the basis of a second result by the analysis.

The processor may deliver a graphics signal corresponding to at least one result among the first result and the second result to the first display device.

The processor may transmit a screen takeover command as a first power saving control command to the second computer system, receive a graphics signal of the second computer from the second computer system, and deliver the graphics signal of the second computer to the first display device.

The first computer may be a low power small computer that consumes less power than the second computer.

The first computer may further include a motion detecting device configured to sense a user movement around the second computer system to generate motion sensing information and deliver the motion sensing information to the processor. The processor may generate a second power saving control command on the basis of the motion sensing information and transmit the generated second power saving control command to the second computer system.

After the processor transmits state information request messages to the second computer system, when the processor fails to receive the requested state information for a threshold period of time from the second computer system, the processor may generate a third power saving control command and transmit the generated third power saving control command to the second computer system.

The processor may generate a fourth power saving control command on the basis of sleep mode configuration information of the second computer system, and transmit the generated fourth power saving control command to the second computer system.

Another exemplary embodiment of the present invention provides a method for controlling power saving of a first computer system including a first computer and a first display device. The power control saving method may include: requesting a second computer system including a second computer and a second display device to transmit state information thereof; receiving the state information from the second computer system; generating a power saving control command on the basis of the state information; and transmitting the power saving control command to the second computer system. The state information may include at least one of system state information and power state information of the second computer system. The power saving control command may be a command for controlling power saving of at least one of the second computer and the second display device. The first computer may be a low power small computer that consumes less power than the second computer.

The power saving control method may further include performing user authentication, before the requesting the state information of the second computer system.

The power saving control method may further include generating the power saving control command on the basis of a number of presses of a button by a user, and transmitting the generated power saving control command to the second computer system.

Yet another embodiment of the present invention provides a computer system. The computer system may include a first computer including a first processor, and a first display device connected to the first computer and configured to display an image through a graphics signal of the first computer.

The first processor may collect at least one of information among system state information and power state information and transmit the collected information to the second computer, and perform power saving control on at least one of the first computer and the first display device in response to a power saving control command received from the second computer. The second computer may analyze the state information received from the first computer and display the analysis results on a second display device connected to the second computer. The second computer may be a low power small computer that consumes less power than the first computer.

DETAILED DESCRIPTION OF THE EMBODIMENTS

Figure 1:
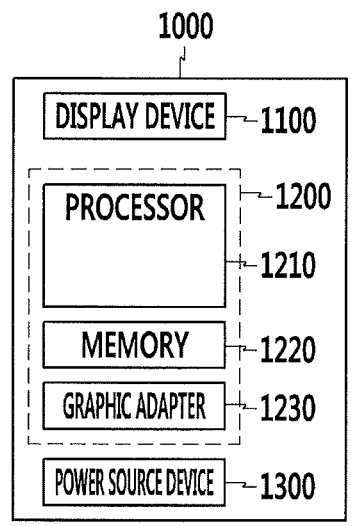
FIG. 1 is a view illustrating a related art computer system.
Figure 2:
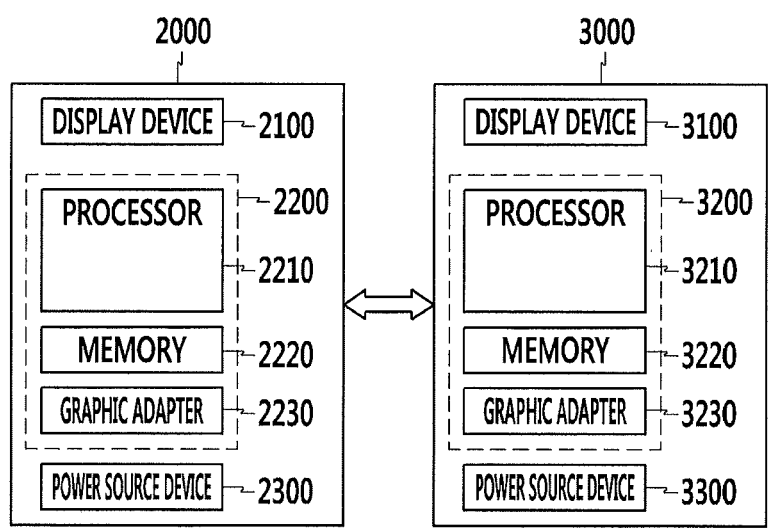
FIG. 2 is a view illustrating a computer system and a watchdog computer system according to an exemplary embodiment of the present disclosure.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. FIG. 2 is a view illustrating a computer system 2000 and a watchdog computer system 3000 according to an exemplary embodiment of the present disclosure. The computer system 2000 is a computer system subjected to power saving control by the watchdog computer system 3000.

The computer system 2000 includes a display device 2100, a computer 2200, and a power supply device 2300.

The display device 2100 is a display device (e.g., a monitor) of the computer system 2000, which displays an image through a graphics signal.

The computer 2200, a main frame of the computer system 2000, includes a processor 2210, a memory 2220, and a graphics adapter 2230.

The memory 2200 stores power saving configuration information.

When a state information transmission request is received from the watchdog computer system 3000, the processor 2210 collects system state information of the computer system 2000 and transmits the collected system state information to the watchdog computer system 3000. Here, the system state information is information on CPU usage, power consumption, and the like.

The processor 2210 receives a power saving control command from the watchdog computer system 3000 and performs power saving control on at least one of the computer 2200 and the display device 2100 on the basis of the power saving control command. Meanwhile, when the processor 2210 receives a power saving configuration information transmission request from the watchdog computer system 3000, the processor 2210 transmits power saving configuration information stored in the memory 2220 to the watchdog computer system 3000.

The graphics adapter 2230 performs an operation related to image processing and generates a display control signal.

The power supply device 2300 supplies power to the display device 2100 and the computer 2200. In FIG. 2, the case in which the power device 2300 is not included in the computer 2200 is illustrated, but the power supply device 2300 may be designed to be included in the computer 2200.

The watchdog computer system 3000 monitors the computer system 2000. In detail, the watchdog computer system 3000 includes a display device 3100, a computer 3200, and a power supply device 3300. The watchdog computer system 3000 is designed as a low power computer system which consumes a considerably small amount of power, compared to the computer system 2000. Meanwhile, the watchdog computer system 3000 may be a sensor node, an mWh-class subminiature tablet, an mWh-class USB, a thin wireless client computer, and the like.

The display device 3100 is a display device (e.g., a monitor) of the watchdog computer system 3000, which displays an image through a graphics signal. Meanwhile, the display device 3100 may be a low power small liquid crystal display (LCD), or light emitting diode (LED) monitor.

The computer 3200 includes a processor 3210, a memory 3220, and a graphics adapter 3220.

The processor 3210 requests state information transmission from the computer system 2000, receives system state information from the computer system 2000, analyzes and determines a system state of the computer system 2000 by using the received system state information, and generates a power saving control command on the basis of analysis and determination results and the power saving configuration information. Here, the power saving control command is a command for controlling power saving of at least one of the display device 2100 and the computer 2200. In detail, the power saving control command may be a command for controlling ON/OFF of the display device 2100, a command for moving display information to the watchdog computer system 3000, a command for controlling ON/OFF of the computer 2200, or a command (e.g., a sleep mode control command, or the like) for controlling ON/OFF of some devices of the computer 2000, or the like. The power saving configuration information may be information which has been received from the computer system 2000 and stored in the memory 3220. The processor 3210 transmits the power control command to the computer system 2000. The processor 3210 generates system profile information corresponding to the analysis and determination result and stores the generated system profile information in the memory 3220, and performs controlling of the computer system 2000.

The graphics adapter 3230 performs an operation related to image processing and generates a graphics signal.

The power supply device 3300 supplies power to the display device 3100 and the computer 3200. In FIG. 2, the case in which the power supply device 3300 is not included in the computer 3200 is illustrated, but the power supply device 3300 may be designed to be included in the computer 3200.

Figure 3:
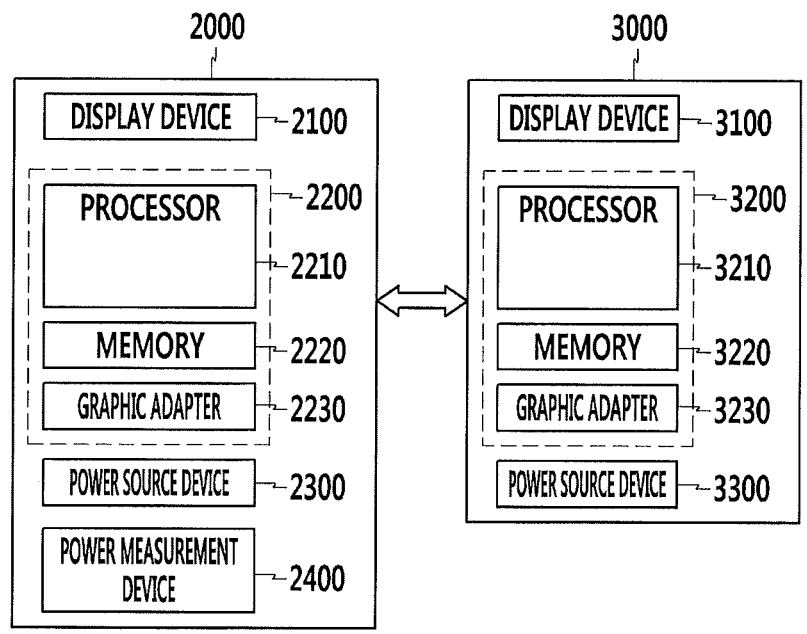
FIG. 3 is a view illustrating a computer system and a watchdog computer system according to another exemplary embodiment of the present disclosure.

FIG. 3 is a view illustrating a computer system 2000 and a watchdog computer system 3000 according to another exemplary embodiment of the present disclosure. The computer system 2000 may further include a power measurement device 2400. Hereinafter, differences of the computer systems 2000 and 3000 illustrated in FIG. 3 from those of FIG. 2 will be largely described.

The power measurement device 2400 measures a power state of the computer system 2000, generates power state information, and transmits the generated power state information to the processor 2210. The power measurement device 2400 may be designed to measure a power state of the display device 2100 and various devices within the computer 2200. Here, the power state information is information based on power information (e.g., current, voltage, power consumption, and the like) of the power supply device 2300. In FIG. 3, a case in which the power measurement device 2400 is not included in the computer 2200 is illustrated, but the power measurement device 2400 may be designed to be included in the computer 2200. Meanwhile, the power measurement device 2400 may discriminately measure a power state of the display device 2100 and the computer 2200.

The processor 2210 collects power state information and transmits the collected power state information to the watchdog computer 3000. Meanwhile, the processor 2210 performs power saving control of the computer 2200 and the display device 2100 on the basis of a power saving control command received from the watchdog computer system 3000.

The processor 3210 of the watchdog computer system 3000 receives power state information from the computer system 2000, analyzes and determines a power state of the computer system 2000 by using the received power state information, and generates a power saving control command on the basis of the analysis and determination result and the power saving configuration information stored in the memory 3220. Here, the power saving control command is a command for controlling power saving of at least one of the computer 2200 and the display device 2100.

The processor 3210 transmits a power saving control command to the computer system 2000. The processor 3210 generates power profile information corresponding to the analysis and determination results and stores the information in the memory 3220, and outputs a monitored state to the display device 3100.

Figure 4:
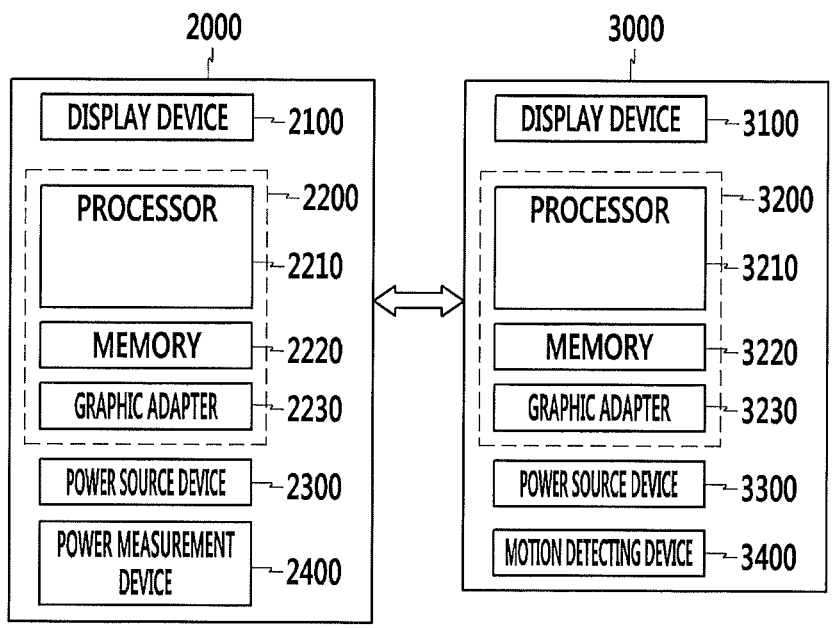
FIG. 4 is a view illustrating a computer system and a watchdog computer system according to another exemplary embodiment of the present disclosure.

FIG. 4 is a view illustrating a computer system 2000 and a watchdog computer system 3000 according to another exemplary embodiment of the present disclosure. The watchdog computer system 3000 may further include a motion detecting device 3400. Hereinafter, differences of the computer systems 2000 and 3000 illustrated in FIG. 4 from those of FIG. 3 will be largely described.

The motion detecting device 3400 senses a user's movement, or the like, around the computer system 2000 and generates motion sensing information. The motion detecting device 3400 delivers the motion sensing information to the processor 3210. In detail, the motion detecting device 3400 may include a motion sensor.

The processor 3210 generates a power saving control command on the basis of the motion sensing information, and transmits the power saving control command to the computer system 2000.

Meanwhile, in the above, the method for controlling power saving using system state information has been described with reference to FIG. 2, and the method for controlling power saving using power state information has been described with reference to FIGS. 3 and 4, but these are merely illustrative and the present invention may be designed to use both the system state information and the power state information in the event of power saving control.

Figure 5:
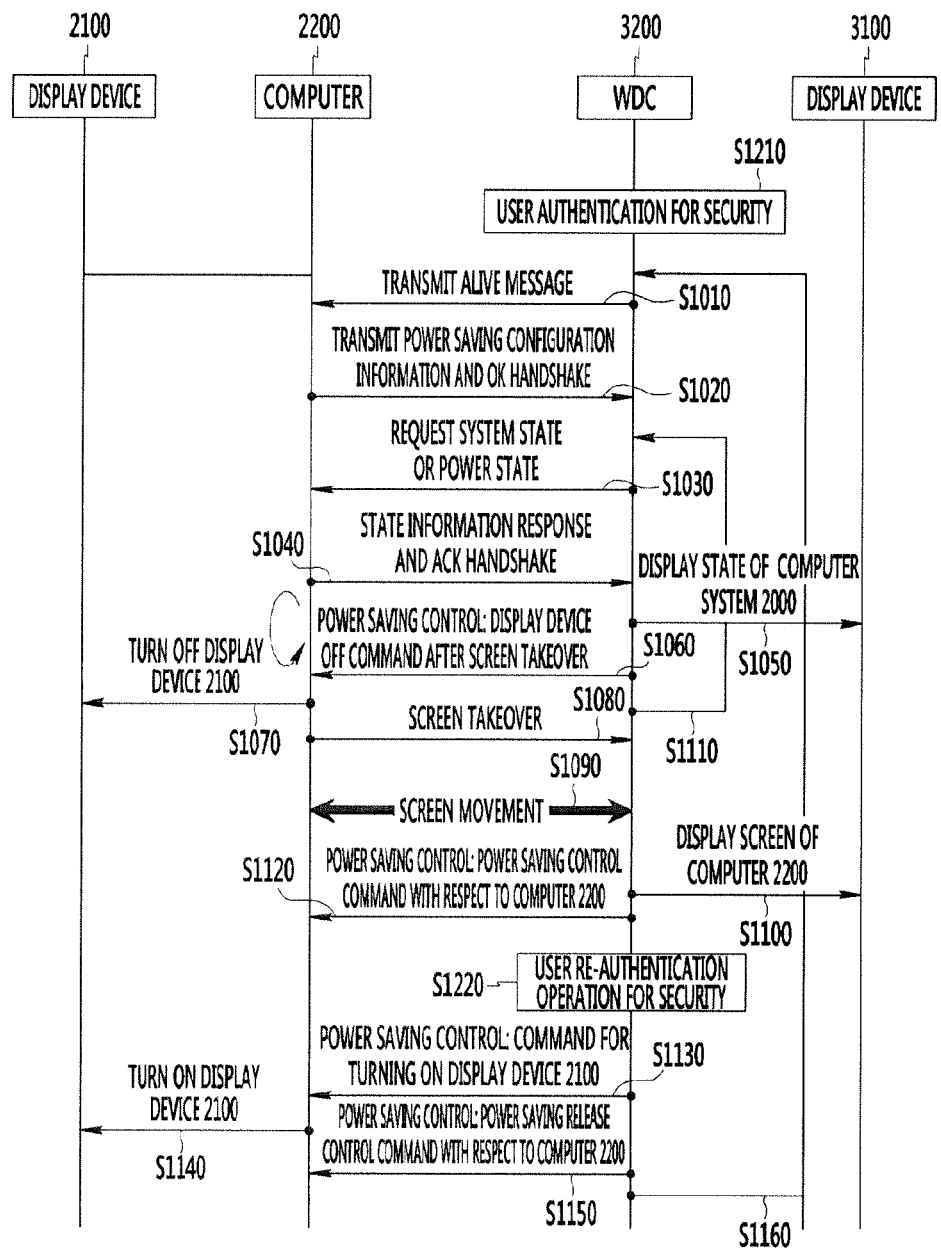
FIG. 5 is a view illustrating a process of controlling power saving according to an exemplary embodiment of the present disclosure.

FIG. 5 is a view illustrating a process of controlling power saving according to an exemplary embodiment of the present disclosure. In FIG. 5, a process of controlling power saving performed through interworking between the computer 2200 and the watchdog computer (WDC) 3200 is illustrated. The watchdog computer 3200 is in a wake-up state all the time, and performs user authentication for security (S1210). When user authentication is completed, the watchdog computer 3200 transmits an alive message indicating that it is alive to the computer 2200 (S1010).

The computer 2200 transmits power saving configuration information and an OK handshake message to the watchdog computer 3200 (S1020).

The watchdog computer 3200 stores the power saving configuration information in the memory 3220.

The watchdog computer 3200 requests state information (system state information or power state information) from the computer 2200 (S1030).

The computer 2200 collects state information of the computer system 2000 and transmits the collected state information to the watchdog computer 3200, and transmits an ACK handshake message to the watchdog computer 3200 (S1040).

The watchdog computer 3200 analyzes and determines a state (system state or power state) of the computer system 2000 by using the received state information. The watchdog computer 3200 displays the analysis and determination result (state of the computer system 2000) on the display device 3100 (S1050).

The watchdog computer 3200 generates a power saving control command on the basis of the analysis and determination results and the power saving configuration information stored in the memory 3220. The watchdog computer 3200 transmits the power saving control command to the computer 2200. When the power saving control command transmitted from the watchdog computer 3200 is a command for taking over a screen and subsequently turning off the display device 2100 (S1060), the computer 2200 performs an operation of a screen takeover to the display device 3100 (S1080) and turns off the display device 2100 (S1070). In detail, the computer 2200 transmits a graphics signal of the graphics adapter 2230 to the watchdog computer 3200. The watchdog computer 3200 displays an image through the received graphics signal of the graphics adapter 2230 on the display device 3100 (S1100). Through the process (S1080 and S1100), a screen is moved from the display device 2100 to the display device 3100 (S1090).

If the power saving control command transmitted from the watchdog computer 3200 is a command for converting a mode of the computer 2200 to a power saving mode (s1120), the computer 2200 converts its mode into the power saving mode.

If the power saving control command transmitted from the watchdog computer 3200 is a command for turning on the display device 2100 (S1130), the computer 2200 turns on the display device 2100 (S1140). Meanwhile, before transmitting the power saving control command for turning on the display device 2100 to the computer 2200, the watchdog computer 3200 may perform a user re-authentication operation for security (S1220).

If the power saving control command transmitted from the watchdog computer 3200 is a command for converting the mode of the computer 2200 to a normal mode (S1150), the computer 2200 converts its mode from the power saving mode to the normal mode.

Meanwhile, the watchdog computer 3200 may process a state information transmission request operation, a state information analyzing and determining operation, and a power saving control command transmission operation, as a periodic watchdog timer routine (S1110). For example, when a timer is set to 10 seconds, the watchdog computer 3200 performs the state information transmission request operation, the state information analyzing and determining operation, and the power saving control command transmission operation every 10 seconds.

Meanwhile, when the computer 2200 is converted from the power saving mode to the normal mode according to a power saving release command of the watchdog computer 3200, the watchdog computer 3200 performs an initial operation (alive message transmission, or the like) for power saving control with respect to the computer system 2000 (S1160).

As illustrated in FIG. 5, the computer 2200 processes only a request or command from the watchdog computer 3200 and keeps performing its original function.

The command transmitted by the watchdog computer 3200 to the computer 2200 may include a power saving configuration information request, a state information request, conversion of the power saving mode of the computer 2200, the request for moving screen of the display device 2100, a command for turning off the display device 2100, and the like. When the computer 2200 receives a command from the watchdog computer 3200, the computer 2200 may execute a control function corresponding to the received command in an operating system (OS) or BIOS (Basic Input Output System) and provide the execution result to the watchdog computer 3200.

Referring to the related art power saving method, since the computer 1200 handles both state monitoring and power saving control, it is difficult to control conversion from an OS power saving function of the computer 1200 to a deep sleep mode. However, in the present exemplary embodiment, as illustrated in FIG. 5, the watchdog computer 3200 determines power saving control and the computer 2200 performs simple command processing, so it is easy to control the computer 2200 to be converted into a deep sleep mode.

Figure 6:
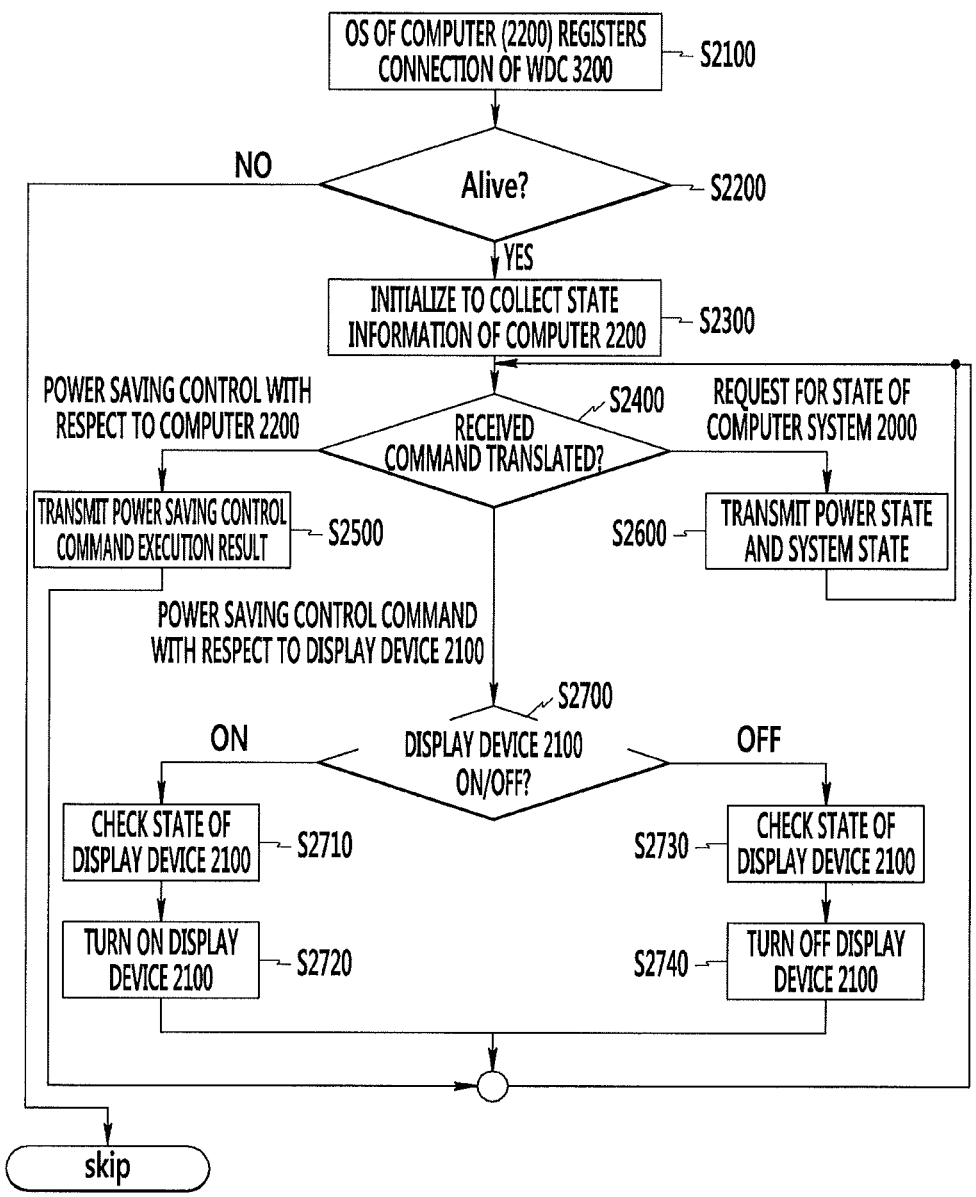
FIG. 6 is a flowchart illustrating an operation related to power saving control of a computer system according to an exemplary embodiment of the present disclosure.

FIG. 6 is a flowchart illustrating an operation related to power saving control of a computer system 2000 according to an exemplary embodiment of the present disclosure.

An OS of the computer 2200 registers connection of the watchdog computer 3200 (S2100).

When the computer 2200 receives an alive message from the watchdog computer 3200, the computer 2200 initializes a relevant configuration in order to collect state information (system state information or power state information) of the computer system 2000 (S2200 and S2300). In detail, the computer 2200 may initialize a minimum power saving control environment (e.g., collecting of CPU usage, power measurement amount, or the like). The computer 2200 executes a relevant program (e.g., powerSave IO Daemon) for the initialization operation (S2300).

When the computer 2200 receives a command from the watchdog computer 3200, the computer 2200 translates the received command (S2400), and when the received command is a power saving control command with respect to the computer 2200, the computer 2200 performs a power saving operation (e.g., conversion to the power saving mode, power-off, or the like) corresponding to the received command, and transmits the performing result to the watchdog computer 3200 (S2500).

If the received command is a command for turning on the display device 2100 (S2700), the computer 2200 checks a current state of the display device 2100 (S2710) and turns on the display device 2100 (S2720). If the received command is a command for turning off the display device 2100 (S2700), the computer 2200 checks a current state of the display device 2100 (S2730) and turns off the display device 2100 (S2740).

If the received command is a command for transmitting state information of the computer system 2000, the computer 2200 collects state information of the computer system 2000 and transmits the collected state information to the watchdog computer 3200 (S2600).

Meanwhile, when no command (or request) is received from the watchdog computer 3200, the computer 2200 does not perform any operation in relation to power saving control.

Figure 7:
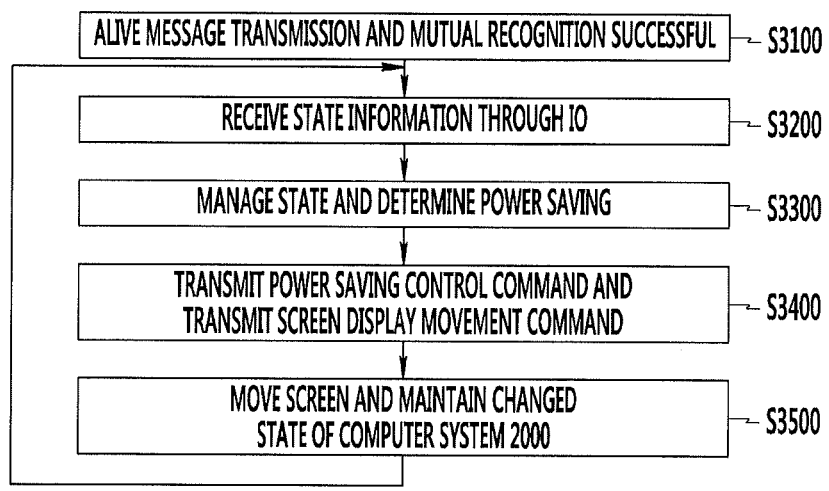
FIG. 7 is a flowchart illustrating a process of controlling power saving of a watchdog computer system according to an exemplary embodiment of the present disclosure.

FIG. 7 is a flowchart illustrating a process of controlling power saving of a watchdog computer system 3000 according to an exemplary embodiment of the present disclosure.

The watchdog computer 3200 transmits an alive message to the computer 2200 and performs a device recognition operation with respect to the computer 2200 (S3100).

The watchdog computer 3200 receives state information (system state information or power state information) of the computer system 2000 from the computer 2200 through an input/output interface (S3200).

The watchdog computer 3200 analyzes and manages a state (system state or power state) of the computer system 2000 using the received state information, and determines whether to perform power saving on the computer system 2000 on the basis of the power saving configuration information (S3300). In detail, the watchdog computer 3200 may determine i) whether requested information has not been received for a pre-set period of time after a request for the information was transmitted to the computer 2200, ii) whether a current resource use and power consumption pattern (e.g., when there is no change in resource use, or the like) of the computer system 2000 is determined to correspond to an idle state on the basis of the state information received from the computer 2200, iii) whether a user's movement has not been sensed by the motion detecting device 3400, or iv) what kind of power saving control command is to be generated or whether to generate a screen takeover command.

The watchdog computer 3200 generates a power saving control command according to the determination result in operation S3300 and transmits the generated power saving control command to the computer 2200 (S3400). The watchdog computer 3200 may transmit a command for moving a screen from the display device 2100 to the display device 3100, to the computer 2200.

When a graphics signal is received from the computer 2200 after the screen movement command is transmitted, the watchdog computer 3200 displays an image through the received graphics signal on the display device 3100. The watchdog computer 3200 maintains the changed state of the computer system 2000 according to the command (S3500).

As illustrated in FIG. 7, the watchdog computer 3200 is a supervisor that determines whether to perform power saving control on the computer system 2000 on the basis of a system state and a power state of the computer system 2000. That is, the watchdog computer 3200, as the supervisor, receives state monitoring information of the computer system 2000, manages a state of the computer system 2000, determines whether to perform power saving control, generates a power saving control command, maintains a state of the computer system 2000, and performs a screen display function.

Figure 8:
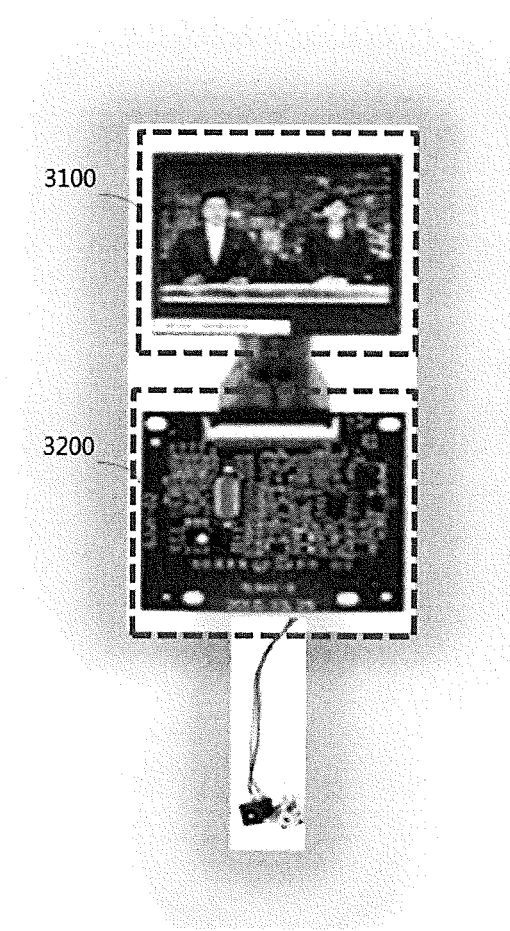
FIG. 8 is a view illustrating an example of a watchdog computer system.

FIG. 8 is a view illustrating an example of a watchdog computer system 3000.

As illustrated in FIG. 8, the watchdog computer system 3000 may be a computer system in which the computer 3200 and the display device 3100 are integrated (i.e., an integral computer/display device computer system). Also, as illustrated in FIG. 8, the watchdog computer system 3000 may be a low power subminiature computer that may be simply installed in any location (e.g., on the display device 2100, a desk on which the computer system 2000 is placed, or the like) where a user may conveniently view the watchdog computer system 3000. In FIG. 8, a case in which a screen is moved from the display device 2100 to the display device 3100 according to a screen takeover command is illustrated.

Figure 9:
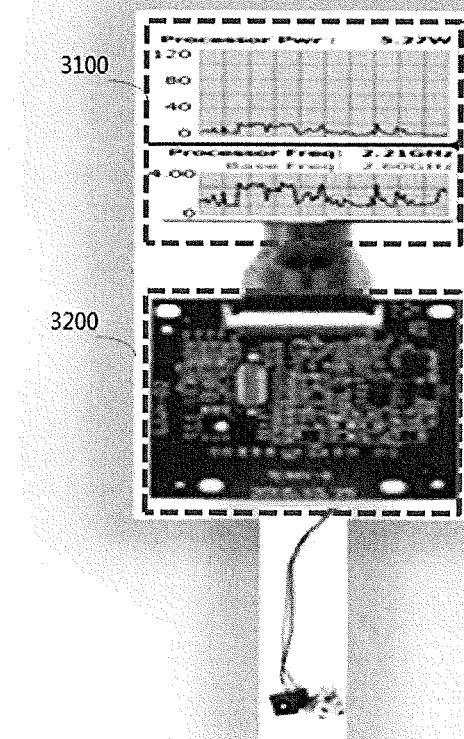
FIG. 9 is a view illustrating another example of a watchdog computer system.

FIG. 9 is a view illustrating another example of a watchdog computer system.

In FIG. 9, a case in which the watchdog computer 3200 displays a monitored state (system state or power state) of the computer system 2000 analyzed by using state information (system state information or power state information) of the computer system 2000 on the display unit 3100 is illustrated.

Meanwhile, the present disclosure may be summarized as follows. In the present disclosure, in order to reduce power consumption of the computer system 2000, a system state or power state of the computer 2200 and the display device 2100 are monitored through the dedicated power saving type of watchdog computer system 3000, and power control is performed on the computer system 2000 according to a pre-set power management policy. Here, the watchdog computer system 3000 has a function of cutting off power of the display device 2100 remotely, a function of moving a display screen of the computer 2200 to the subminiature display device 2100 for a predetermined period of time, a function of periodically collecting a state (system state or power state) of the computer system 2000, and the like.

Further, the watchdog computer system 3000 may control power of the computer system 2000 through a button. In detail, the watchdog computer system 3000 may control ON/OFF of the computer 2200 and the display device 2100 through a first button. For example, the watchdog computer system 3000 may control the computer system 2000 to turn off only the computer 2200, turn off only the display device 2100, turn off both the computer 2200 and the display device 2100, turn on only the computer 2200, turn on only the display device 2100, and turn on both the computer 2200 and the display device 2100, according to a number of presses of the first button by a user. The watchdog computer system 3000 may control a sleep mode of the computer 2200 through a second button. For example, the watchdog computer system 3000 may control the computer 2200 to enter a medium sleep mode state (e.g., sleep mode state for one minute), enter a deep sleep mode state (e.g., a sleep mode state for one hour), or a permanent sleep mode state (e.g., a sleep mode state without a time limit) according to a number of presses of the second button by the user. Here, the first button and the second button may be image buttons displayed on the screen of the display device 3100 or physical buttons included in the watchdog computer system 3000.

According to an exemplary embodiment of the present invention, since the process of the main computer system collects a power state and transmits the same to the low power watchdog computer and the low power watchdog computer analyzes the power state and determines a power saving policy, a large amount of power may be saved.

Also, according to an exemplary embodiment of the present invention, since the main computer system does not perform state monitoring and an operation for power saving (e.g., a state analysis, power saving policy determination, and the like), deep sleep may be possible by a scheduler and monitoring overhead is eliminated, and since the low power watchdog computer that performs only state analysis and power saving control operation with low power is independently provided, power saving of the main computer system is facilitated.

Further, according to the related art power saving control method, in order to display a state monitoring result on a display device of a main computer system, it is impossible to turn off a computer main frame or a display device. However, according to the exemplary embodiment of the present invention, a state monitoring result may be displayed through the low power small display device of the low power watchdog computer system.

In addition, according to an exemplary embodiment of the present invention, since the screen of the main computer system is switched to the low power subminiature display device of the watchdog computer system and the display device and the graphics adapter of the main computer system are turned off, a significant power saving effect may be obtained, compared to the case of using a hybrid graphics device (power saving mode graphics, high performance mode graphics).

Also, according to an exemplary embodiment of the present invention, since the low power watchdog computer is a milliwatt (Mw)-class computer, a power saving effect of the main computer system is significant, compared to additional power consumption of the low power watchdog computer. The low power watchdog computer serves as a supervisor of power saving control, rather than as an auxiliary unit of the main computer system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A first computer system comprising:
   a first computer that includes a first processor, wherein
      the first computer is located in a user environment of a second computer system including a second computer and a second display device such that a user of the second computer, while using the second computer, can view the first computer, and
      the first computer is a milliwatt class computer that consumes less power than the second computer; and
   a first display device connected to the first computer and configured to display an image through a graphics signal, wherein
   the first processor to
      transmit an alive message indicating that the first computer is alive to the second computer when user authentication is completed,
      store power saving configuration information when the power saving configuration information is received from the second computer,
      perform, using a timer, periodic power saving control for the second computer system by periodically requesting state information of the second computer system,
      receive, from the second computer system in response to the periodically requesting, the state information including at least one of
         system state information, which includes a CPU usage of the second computer system, and
         power state information, which includes a current of at least one component of the second computer system and a voltage of at least one component of the second computer system,
      generate a first power saving control command on the basis of the received state information by,
         in response to the received state information being the system state information, analyzing a system state of the second computer system on the basis of the system state information and generating the first power saving control command on the basis of a first result by the analysis and the stored power saving configuration information,
         in response to the received state information being the power state information, analyzing a power state of the second computer system on the basis of the power state information and generating the first power saving control command on the basis of a second result by the analysis and the stored power saving configuration information,
      display the first result or the second result on the first display device, and
      transmit the generated first power saving control command to the second computer system, and
   the first power saving control command is a command for controlling power saving of at least one of the second computer and the second display device.

2. The computer system of claim 1, wherein the first processor delivers a graphics signal corresponding to at least one result among the first result and the second result to the first display device.

3. The computer system of claim 2, wherein the first power saving control command includes a screen takeover command, and
   the first processor
      transmits the screen takeover command to the second computer system,
      receives a graphics signal of the second computer from the second computer system, and
      delivers the graphics signal of the second computer to the first display device.

4. The computer system of claim 1, wherein
   the first computer further comprises a motion detecting device configured to sense a user movement around the second computer system to generate motion sensing information and deliver the motion sensing information to the first processor, and the first processor receives the motion sensing information, generates a second power saving control command on the basis of the received motion sensing information, and transmits the generated second power saving control command to the second computer system.

5. The computer system of claim 1, wherein after the first processor transmits state information request messages to the second computer system, when the first processor fails to receive the requested state information for a threshold period of time from the second computer system, the first processor generates a second power saving control command and transmits the generated second power saving control command to the second computer system.

6. The computer system of claim 5, wherein
the power saving configuration information of the second computer system includes initial configuration information for converting a mode of the second computer system into a sleep mode, and
the first processor
generates a second power saving control command on the basis of the initial configuration information to convert the second computer system into the sleep mode, and
transmits the generated second power saving control command to the second computer system.

7. A method for controlling power saving of a second computer system by a first computer system including a first computer and a first display device, the method comprising:
transmitting an alive message indicating that the first computer is alive to the second computer system including a second computer and a second display device when user authentication is completed;
storing power saving configuration information when the power saving configuration information is received from the second computer;
periodically requesting the second computer system to transmit state information thereof, wherein the state information includes at least one of system state information, which includes a CPU usage of the second computer system, and power state information, which includes a current of at least one component of the second computer system and a voltage of at least one component of the second computer system;
receiving the state information from the second computer system in response to the periodically requesting;
generating a power saving control command on the basis of the received state information by,
in response to the received state information being the system state information, analyzing a system state of the second computer system on the basis of the system state information and generating the power saving control command on the basis of a first result by the analysis and the stored power saving configuration information,
in response to the received state information being the power state information, analyzing a power state of the second computer system on the basis of the power state information and generating the power saving control command on the basis of a second result by the analysis and the stored power saving configuration information;
displaying the first result or the second result on the first display device; and transmitting the power saving control command to the second computer system, wherein
the power saving control command is a command for controlling power saving of at least one of the second computer and the second display device, and
the first computer is a milliwatt class computer that consumes less power than the second computer and is located in a user environment of the second computer system such that a user of the second computer, while using the second computer, can view the first computer.

8. The method of claim 7, further comprising:
when the power saving control command includes a screen takeover command and the screen takeover commend is transmitted to the second computer system, receiving a graphics signal of the second computer from the second computer system; and
displaying the graphics signal of the second computer on the first display device.

9. The method of claim 7, wherein
the generating of the power saving control command comprises:
displaying at least one of the first result and the second result on the first display device.

10. The method of claim 7, further comprising
generating a first power saving control command on the basis of a number of presses of a first button by the user,
generating a second power saving control command on the basis of a number of presses of a second button by the user, and
transmitting at least one of the first power saving control command and the second power saving control command to the second computer system,
wherein the first power saving control command is for turning off at least one of the second computer and the second display device, and
the second power saving control command corresponds to one among a first sleep mode with a first time limit, a second sleep mode with a second time limit, and a third sleep mode without a time limit, depending on the number of presses of the second button.

11. A main computer system comprising:
a main computer including a first processor; and
a main display device connected to the main computer and configured to display an image through a graphics signal of the main computer, wherein
the first processor
collects state information including at least one of system state information, which includes a CPU usage of the main computer, and power state information, which includes a voltage of at least one component of the main computer and the main display device and a current of at least one component of the main computer and the main display device,
transmits the collected information to a watchdog computer, and
performs power saving control on at least one of the main computer and the main display device in response to a power saving control command received from the watchdog computer,
the watchdog computer
transmits an alive message indicating that the watchdog computer is alive to the main computer when user authentication is completed,
stores power saving configuration information when the power saving configuration information is received from the main computer, performs periodic power saving control for the main computer by periodically requesting the state information of the main computer,
receives the state information from the main computer in response to the periodically requesting,
analyzes the received state information from the main computer by,
   in response to the received state information being the system state information, analyzing a system state of the main computer system on the basis of the system state information and generating the power saving control command on the basis of a first result by the analysis and the stored power saving configuration information, and
   in response to the received state information being the power state information, analyzing a power state of the main computer system on the basis of the power state information and generating the power saving control command on the basis of a second result by the analysis and the stored power saving configuration information, and
displays the first result or the second result on a watchdog display device connected to the watchdog computer, and
the watchdog computer is a milliwatt class computer that consumes less power than the main computer and is connected to the main computer in a user environment of the main computer such that a user of the main computer, while using the main computer, can view the watchdog computer.

12. The main computer system of claim 11, wherein when the power saving control command is a first command for turning off the main display device, the first processor turns off the main display device.

13. The main computer system of claim 11, wherein when the power saving control command is a screen takeover command, the first processor transmits the graphics signal to the watchdog computer.

14. The main computer system of claim 11, wherein when the power saving control command is a command for converting a mode of the main computer into a power saving mode, the first processor converts the mode of the main computer into the power saving mode.

15. The main computer system of claim 11, wherein when the power saving control command is a command for turning on the main display device, the first processor turns on the main display device.

16. The main computer system of claim 11, wherein when a state information request message is received from the watchdog computer, the first processor transmits at least one of the system state information and the power state information to the watchdog computer.

17. The main computer system of claim 11, wherein the main computer further comprises a power measurement device configured to measure a power state of the main computer system to generate the power state information, and deliver the power state information to the first processor.

* * * * *